US008195830B2

(12) United States Patent
Tian (10) Patent No.: US 8,195,830 B2
(45) Date of Patent: Jun. 5, 2012

(54) EFFICIENT FILE TRANSFER ON WEB SERVICE-ENABLED IMAGE FORMING DEVICE

(75) Inventor: Lifen Tian, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 469 days.

(21) Appl. No.: 12/491,192

(22) Filed: Jun. 24, 2009

(65) Prior Publication Data

US 2010/0332677 A1 Dec. 30, 2010

(51) Int. Cl.
*G06F 15/16* (2006.01)
(52) U.S. Cl. ........................................ 709/233; 709/229
(58) Field of Classification Search .................. 709/208, 709/218, 227, 233, 229
See application file for complete search history.

*Primary Examiner* — Larry Donaghue
*Assistant Examiner* — Marshall McLeod
(74) *Attorney, Agent, or Firm* — Hickman Palermo Truong Becker Bingham Wong LLP; Daniel D. Ledesma (57) ABSTRACT

Techniques are provided for efficiently transferring documents (or files) between a client device and a WS-enabled device. A document is divided into a plurality of distinct chunks. Each chunk is packaged in a separate SOAP message. Each SOAP message includes a document identifier and a data transmission serial number (DTSN). The DTSN uniquely identifies a particular chunk of the document relative to the other chunks of the document. After one or more chunks of the document are transferred, the size of one or more subsequent chunks is adjusted based on changes in the client device, the WS-enabled device, and/or the network connection. Thereafter, each of the one or more subsequent chunks of the document is either larger or smaller than the one or more chunks that were already transferred.

20 Claims, 7 Drawing Sheets

```
<?xml version="1.0" encoding="utf-8"?>
<soap:Envelope xmlns:soap="http://www.w3.org/2003/05/soap-envelope"
xmlns:wsa="http://schemas.xmlsoap.org/ws/2004/08/addressing" xmlns:wsca="http://schemas.wscamera.com/v1">
    <soap:Header>
        <wsa:To>urn:uuid:a9b5a745-2156-468e-b7fc-fc85530b2eb6</wsa:To>
        <wsa:Action>http://schemas.wscamera.com/v1/RetrievePhoto</wsa:Action>
        <wsa:MessageID>urn:uuid:ce5efba3-182d-42b3-9a96-ca1eebbc0c24</wsa:MessageID>
        <wsa:From><wsa:Address>urn:uuid:78be7677-140c-4e83-9fa1-07db3998832db</wsa:Address></wsa:From>
    </soap:Header>
    <soap:Body>
        <wsca:RetrievePhotoRequest>
            <wsca:PhotoId>1</wsca:PhotoId>
        </wsca:RetrievePhotoRequest>
    </soap:Body>
</soap:Envelope>
```

SOAP REQUEST MESSAGE 310

FIG. 3A

```
<?xml version="1.0" encoding="utf-8"?>
<soap:Envelope xmlns:soap="http://www.w3.org/2003/05/soap-envelope" xmlns:wsa="http://schemas.xmlsoap.org/ws/2004/08/addressing"
  xmlns:wsca="http://schemas.wscamera.com/v1" xmlns:xmlmime="http://www.w3.org/2004/11/xmlmime"
  xmlns:xop="http://www.w3.org/2004/08/xop/include">
  <soap:Header>
    <wsa:To>urn:uuid:78be7677-140c-4e83-9fa1-07db398832db</wsa:To>
    <wsa:Action>http://schemas.wscamera.com/v1/RetrievePhotoResponse</wsa:Action>
    <wsa:MessageID>urn:uuid:cf5efba3-182d-42b3-9a96-ccccccccccf</wsa:MessageID>
    <wsa:RelatesTo>urn:uuid:ce5efba3-182d-42b3-9a96-ca1eebbc0c24</wsa:RelatesTo>
  </soap:Header>
  <soap:Body>
    <wsca:RetrievePhotoResponse>
      <wsca:SID>1234</wsca:SID>
      <wsca:PhotoDescription>
        <wsca:PhotoName>GroupPhoto.jpg</wsca:PhotoName>
        <wsca:PhotoInfo>Our group picture taken at restaurant</wsca:PhotoInfo>
      </wsca:PhotoDescription>
      <wsca:PhotoData xmlmime:contentType="image/jpeg">
        <xop:Include href="cid:http://example.org/image"/>
      </wsca:PhotoData>
    </wsca:RetrievePhotoResponse>
  </soap:Body>
</soap:Envelope>
```

SOAP RESPONSE MESSAGE 320

EFFICIENT FILE TRANSFER ON WEB SERVICE-ENABLED IMAGE FORMING DEVICE

FIELD OF THE INVENTION

The present invention relates to transferring data between a client device and a Web service-enabled image forming device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Web Services

The World Wide Web Consortium ("W3C") is an international consortium that develops standards for the World Wide Web. The W3C defines a "Web service" as a software system that is designed to support interoperable machine-to-machine interaction over a network. This definition encompasses many different systems, but in common usage, the term refers to those services that use Simple Object Access Protocol (SOAP)-formatted Extensible Markup Language ("XML") envelopes and that have their interfaces described using Web Services Description Language ("WSDL"). Web services allow devices and applications to communicate with each other over one or more networks without the intervention of any human being, while using the same suite of protocols (e.g., Hypertext Transfer Protocol ("HTTP")) that a human being would use to communicate with such devices and applications over one or more networks.

The specifications that define Web services are intentionally modular, and, as a result, there is no one document that defines all Web services. Instead, there are a few core specifications that are supplemented by other specifications as the circumstances and choice of technology dictate. Common core specifications are SOAP, WSDL, WS-Discovery, WS-MetadataExchange, WS-Addressing, and WS-Security. Different specifications address different tasks and functions.

SOAP is an XML-based, extensible message envelope format, with bindings to underlying protocols (e.g., HTTP and Simple Mail Transfer Protocol ("SMTP")). Using XML, SOAP defines how messages should be formatted, so that those messages are formatted in such a way that the recipients of those messages (devices and applications) can understand those messages. SOAP can be used to perform remote procedure calls, for example.

WSDL is an XML format that allows Web service interfaces to be described along with the details of those interfaces' bindings to specific protocols. WSDL is typically used to generate server and client code, and for configuration.

WSD Devices

Some devices that host one or more Web services also implement the Devices Profile for Web Services (DPWS) specification. Such devices are referred to hereinafter as Web Services for Devices (WSD) devices. Non-limiting examples of WSD devices include scanners, printers, copiers, facsimile machines, archiving devices, and any combination of the above.

DPWS defines a minimal set of implementation constraints to enable Web Service messaging, discovery, description, and eventing on devices. The DPWS specification defines an architecture in which devices run two types of services: hosting services and hosted services. Hosting services are directly associated to a device and play an important part in the device discovery process. Hosted services are mostly functional and depend on their hosting device for discovery.

DPWS builds on the following core Web Services standards: WSDL 1.1, XML Schema, SOAP 1.2, WS-Addressing, and further comprises WS-MetadataExchange, WS-Transfer, WS-Policy, WS-Security, WS-Discovery and WS-Eventing.

Service Specifications

Some Web services conform to certain service specifications. A service specification (e.g., WSD Print Service specification) describes the minimum set of APIs that a Web service must implement in order to be compliant with that service specification. For example, a WSD Print Service specification defines (a) a set of operations (e.g., described in a WSDL file) that a print Web service is capable of processing and (b) the events that the print Web service generates. A WSD Scanner Service specification defines (a) a set of operations that a scan Web service is capable of processing and (b) the events that the scan Web service generates.

Service specifications may be standardized by W3C or another Web Services standardizing body, such as the Organization for the Advancement of Structured Information Standards (OASIS).

Data Transmission

Some operating systems support client applications that are configured to communicate with Web services that conform to these service specifications. For example, Microsoft Vista includes a client application that communicates with WS-enabled printers and scanners by following the procedures outline in the WSD Print Service and WSD Scan Service specifications. A "WS-enabled" device is one that implements one or more Web Services specifications. A WSD device is an example of a WS-enabled device.

Problems arise when the data transmission between a Vista client application and a WS-enabled device becomes too slow or is interrupted. For example, during printing, a Vista client application sends print data over a network to a WS-enabled printer. If the network connection is interrupted, then the WS-enabled printer will terminate the transmission when a threshold waiting period has elapsed with no data being transmitted. The user will then have to re-print the whole document. The user may also "re-install" the WS-enabled printer if the user assumes that something is wrong with the printer installation. Printer installation may include not only installing a driver, but also retrieving the printer configuration and capabilities and subscribing for printer events. Further, due to the interrupted network connection, the WS-enabled printer is not able to send out a notification and, consequently, may drop the client subscription. In order to keep receiving real-time printer status and job status events, the client may re-subscribe for those events, which is part of printer "installation."

As another example, during scanning, a Vista client application retrieves a scanned image over a network from a WS-enabled scanner. A significant amount of time is required for the WS-enabled scanner to prepare the scanned image if high resolution colored scanning is requested. Even though the WS-enabled scanner sends the scanned image in chunks to the Vista client application, the interval between consecutive transmissions may be relatively long. Consequently, the Vista client application may close the network connection by assuming something wrong happened either to the WS-enabled scanner or the network.

As another example in the scanning context, a Vista client application may request image information (e.g., pixel per line, bytes per line, and number of lines) from a WS-enabled scanner before the client application retrieves the scanned image. In some circumstances (e.g., document size auto detection), however, the WS-enabled scanner is unable to calculate the requested image information based on the scan settings. Instead, the WS-enabled scanner must first finish scanning the first page of the document. If that scanning takes too long, then the Vista client application may re-set the network connection to avoid a possible dangling communication channel.

To compound these data transmission problems, mobile devices, such as mobile phones and PDAs, are playing an increasingly active role in Web Services. Due to the mobility of a Wi-Fi network, IP addresses of mobile devices may be changed unexpectedly when the mobile devices send a print job or fetch scanned image data. As a result, the printing/scanning setup with a WS-enabled printer or scanner will need to be reestablished.

Also, mobile devices traditionally have fewer processing and memory capacity than personal computers (PCs), such as desktop computers and laptop computers. This difference in resource constraints increases the likelihood that a WS-enabled device may (1) suspect that a network connection is at fault for a delay in communication with a mobile device and, consequently, (2) drop the network connection. In the printing and scanning context, this will cause a user to resend the corresponding print job or scan job.

Additionally, some digital cameras implement one or more Web Services specifications and provide a photo retrieval service to a PC or mobile device. Transferring photo data over a network is even more fragile due to the limited resources on compact digital cameras.

SUMMARY

Techniques are provided for transferring data, over a network, between a client process executing on a client device and a Web service executing on a Web service-enabled device. The Web service-enabled device may also implement the client side of the Web service. A Web service receives, from the client process, a Simple Object Access Protocol (SOAP) message that indicates a request for a service provided by the Web service. In response to receiving the SOAP message, the Web service determines a first size for a portion of a file to be transferred between the client process and the Web service. The portion of the file is less than all of the file. After determining the first size, the Web service processes a first SOAP message that includes a first portion of the file, a file identifier that identifies the file, and a first data transmission serial number that identifies the first portion relative to other portions of the file. The size of the first portion is equal to the first size. After the first SOAP message has been transferred between the client process and the Web service, the Web service determines, based at least in part on one or more criteria, a second size for a different portion of the file. The second size is different than the first size. After determining the second size, the Web service processes a second SOAP message that includes a second portion of the file, the file identifier, and a second data transmission serial number that identifies the second portion relative to other portions of the file. The size of the second portion is equal to the second size. Processing the first and second SOAP messages comprises either generating and sending the first and second SOAP messages to the client process or receiving the first and second SOAP messages from the client process.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Architectural Overview
    2.1 Client Devices
    2.2 Network
    2.3 WS Device
      2.3.1 Communication Module
      2.3.2 Client Identification Module
      2.3.3 Data Handling Module
        2.3.3.1 Data Transmission Serial Number
      2.3.4 Subscription Management Module
      2.3.5 Log Module
  3.0 Example Document Transfer
  4.0 Example SOAP Messages
  5.0 Example Process Flow
  6.0 Implementation Mechanisms
  7.0 Extensions and Alternatives
1.0 General Overview Techniques are provided for efficiently transferring documents (or files) between a client device and a WS-enabled device. A document is divided into a plurality of distinct chunks. Each chunk is packaged in a separate SOAP message. Each SOAP message includes a document identifier and a data transmission serial number (DTSN). The DTSN uniquely identifies a particular chunk of the document relative to the other chunks of the document. After one or more chunks of the document are transferred, the size of one or more subsequent chunks is adjusted based on changes in the client device, the WS-enabled device, and/or the network connection. Thereafter, each of the one or more subsequent chunks of the document is either larger or smaller than the one or more chunks that were already transferred. In an embodiment, any chunks that are not successfully transferred may be resent.

The sending of chunks may be performed by a client device or a WS-enabled device. For example, in the printing context, a client device generates the DTSNs and sends the chunks. In the scanning context, a WS-enabled device generates the DTSNs and sends the chunks.

The following description refers to transferring or streaming a document (or file) between a client device and a WS-enabled device. A "document" may be any electronic data that is sent over a computer network. Non-limiting examples of "documents" include (a) word processing documents, spreadsheet documents, pdf documents, and image data for a print job, (b) image data that results from a scan job, and (c) image data captured by a digital camera or camcorder.

"Streaming" a document refers to sending a portion or chunk (i.e., less than all) of the document one at a time instead of sending the entire document in a single transfer. The streaming of a document may occur, for example in the scanning context, before the entire document is scanned. Also, the "streaming" of a document may occur across one or more distinct network connections. For example, if the network connection is dropped between a client device and a WS-enabled device during the streaming of a document, then a new connection is established, in which the remainder of the document is streamed, without having to re-send the portion of the document that has already been successfully transferred.

2.0 Architectural Overview

Figure 1:
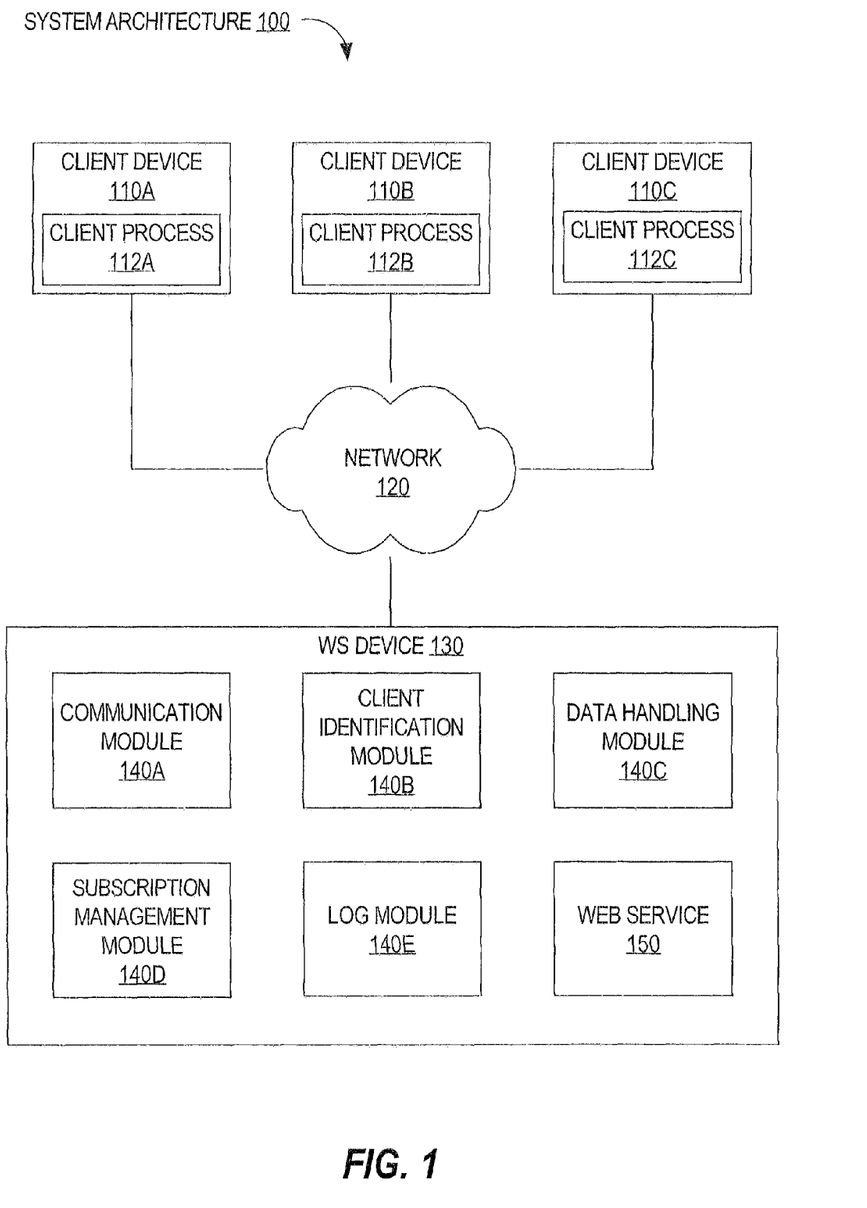
FIG. 1 is a block diagram that depicts an example system architecture, according to an embodiment of the invention.

FIG. 1 is a block diagram that depicts an example system architecture 100, according to an embodiment of the invention. System architecture 100 comprises client devices 110A-C, network 120, and a WS device (shorthand for "WS-enabled device") 130. The number of client devices is not limited to the three client devices depicted in FIG. 1. The number of client devices connected to network 120 may be more or less than three. Additionally, more than one WS device may be connected to network 120.

2.1 Client Devices

Client devices 110A-C may be any devices that are capable of interacting with WS device 130 over network 120. Non-limiting examples of client devices 110A-C include personal computers (PCs), "smart" phones, and personal digital assistants (PDAs).

Client devices 110A-C include, respectively, client processes 112A-C. By executing their respective applications (not shown), each of client processes 112A-C is capable of requesting one or more Web services from WS device 130 and processing SOAP messages that result from such requests. Each of client devices 110A-C includes data storage (not shown) and may execute additional processes (also not shown). Additionally, each of client devices 110A-C may execute a GUI application that allows a user to initiate one or more operations with respect to WS device 130.

A purpose of client processes 112A-C (by executing their respective applications) is to convert a platform-specific procedure call, from a requesting process, to a SOAP request that can be processed by a Web service that "understands" SOAP. On the other hand, one or more of client processes 112A-C may execute a GUI with which a user interacts. In that case, one or more client processes 112A-C converts user clicks into one or more SOAP messages.

For example, a requesting process on client device 110A may be associated with a Microsoft Word application and Web service 150 may be a print service. Client process 112A receives a platform-specific "print data" request from the requesting process. Client process 112A encodes the print data request in a SOAP message that can be processed by the print service.

The client application executed by client processes 112A-C may be installed on client devices 110A-C via a compact disc (CD) or downloaded from a remote server and installed on client devices 110A-C.

A separate client application may be executed for each service with which one of client devices 110A-C communicates. For example, if client device 110A requests services from a print service, scan service, and fax service, then client device 110A executes a print client application, a scan client application, and a fax client application. In this way, each client application may include a specific chunk processing module that can take advantage of the features and capabilities of the corresponding service.

Alternatively, if client device 110A requests multiples services that are hosted on a single multifunction peripheral (MFP), then client device 110A may execute a single client application. In this way, the single client application may share chunk processing module for all the services hosted on the MFP.

2.2 Network

Network 120 may be implemented by any medium or mechanism that provides for the exchange of data between various devices in network 120. Examples of such a network include, without limitation, a network such as a Local Area Network (LAN), Wide Area Network (WAN), Ethernet or the Internet, or one or more terrestrial, satellite, or wireless links. Network 120 may include a combination of networks such as those described. Network 120 may transmit data according to Transmission Control Protocol (TCP) and Internet Protocol (IP).

2.3 WS Device

WS device 130 comprises one or more processors and one or more storage media that store instructions. WS device 130 executes modules 140A-E and hosts Web service 150. Embodiments of the invention are not limited to these specific modules and to a single Web service. For example, WS device 130 may not include an event subscription service, in which case WS device 130 does not include subscription management module 140D. As another example, WS device 130 may host a multiple Web services, such as a print service, a scan service, a fax service, and/or an archive service. Additionally, the functionality of two or more of modules 140A-E may be combined into a single module. Further, one or more of modules 140A-E may be implemented on another device, such as a central server (not shown) that is connected to network 120. This offloading of data processing conserves the resources of WS device 130 for its normal processing, such as providing one or more Web services.

Modules 140A-E and Web service 150 may be implemented in software, hardware, or any combination of software and hardware.

Non-limiting examples of WS device 130 include a printing device, a scanning device, a digital camera or camcorder, and an MFP that includes one or more of the above capabilities, such as printing and scanning.

2.3.1 Communication Module

Communication module 140A parses incoming SOAP messages. A SOAP message comprises a header and a body. The header of a SOAP message typically includes source and destination information, which may be a physical address or a logical address. The header also typically comprises a WS-Addressing (WSA) action field whose value indicates an action to be performed, such as printing, scanning, subscribing for events, or retrieving certain information, such as service metadata. Based on the action field, the wsa:To field in the SOAP header of the request message and/or the Request-URI and HTTP Host header field in the HTTP header of the request message, communication module 140A dispatches the request to the appropriate module for further processing, such as a printing module or a scanning module. It is possible that communication module 140A (a) does not dispatch request messages or (b) is not even present. In such a scenario, the client sends service requests directly to the hosted Web service (e.g. 150). Thus, the hosted Web service, rather than communication module 140A, may determine the request message type and contact the appropriate modules for handling.

Additionally, communication module 140A may be responsible for communicating all (or most) SOAP messages to client. For example, even though subscription management module 140C may generate a SOAP message that notifies a client process of an event, communication module 140A sends the SOAP message.

2.3.2 Client Identification Module

If the action is "significant" request (e.g., a print request or a scan request), then the SOAP message is analyzed by client identification module 140B to determine whether WS device 130 "knows" the client. Client identification module 140B does not need to execute before the action is determined. The action may, for example, be a simple metadata request, in which case client identification module 140B does not need to be executed.

After WS device 130 analyzes the "action" field of the SOAP message and determines that the client device is to be identified, client identification module 140B identifies the client by first checking wsa:From field in the SOAP header of the incoming SOAP request message. The value in the wsa:From field is an endpoint reference (EPR) that indicates the message source information and is optional according to the WS-Addressing specification. If wsa:From field is not present in the request message, then client identification module 140B checks whether the pre-defined client ID is present in the request message. The pre-defined client ID may be in GUID format or EPR format. If the client ID is not present, then client identification module 140B examines transportation information (e.g., the client's IP address) and associates the client with that transportation information.

2.3.2.1 Client ID

A client ID is any identifier that uniquely identifies a client device or "client process" relative to all other client devices or client processes. A client ID is not an IP address. An IP address is subject to change when the IP address is assigned to the client device by a DHCP server. Non-limiting examples of a client ID include (a) an EPR defined by WS-Addressing and (b) a globally unique ID (GUID). A GUID is a 16 byte value. While not guaranteed to be unique, the total number of unique keys ($2^{128}$ or $3.4 \times 10^{38}$) is so large that the probability of the same GUID being generated twice is very small.

A client device may generate a client ID upon its initial start-up. Alternatively, a client device may generate a client ID as part of a "handshaking" process to establish a network connection between the client device and WS device 130. For example, when a user of a client device decides to use a certain printing device, the user installs a print driver for that printing device on the client device. The handshaking process occurs as part of the installation process.

After a client device generates a client ID, every request, sent from the client device to WS device 130, includes the client ID.

The WS device 130 (or a specific Web service of WS device 130) generates a service ID that uniquely identifies the Web service. This may occur as part of the handshaking process. Thus, during the handshaking process, the client device and WS device 130 may exchange their respective identifiers.

2.3.3 Data Handling Module

Data handling module 140C determines, based on one or more criteria, how large each chunk of a document that is sent to a client device will be. Non-limiting examples of the one or more criteria include the resource constraints of WS device 130, the resource constraints of the client device, and a history of network communications between the client device and one or more WS devices. Non-limiting examples of resource constraints include the maximum or current (1) processing capability, (2) memory or buffer capacity, and (3) client device architecture. For example, the processing capability and memory capacity of a cell phone tend to be significantly lower relative to the processing capability and memory capacity of a personal computer (PC). Therefore, data handling module 140C may determine a chunk size for cell phones that is much smaller than a chunk size for PCs.

The history of file transfer with respect to a client device may include information about the client device, such as what chunk size the client device was able to process in the past, whether or not the client device was communicating with WS device 130 or another WS device. The history may also include information about the network, such as the bandwidth and network connection stability. From the history, a client volatility index may be created. A client device with a relatively high volatility is considered a "fragile" client. Client devices that are associated with a relatively high volatility are more likely to experience problems than client devices that are associated with relatively low volatility. Such problems may be network-related (e.g., dropping a network connection) or client device-related (e.g., becoming non-responsive due to lack of processing power or storage space).

If a "fragile" client requests a service from WS device 130, then the service may perform one or more actions to ensure that the transfer of any data to client device completes successfully. Such actions may include: (1) spawning another thread to handle the request; (2) decreasing the chunk size so that each chunk of data is more likely to be delivered to the client device and the data transfer is easier to resume in case of a network error; (3) when WS device 130 is servicing multiple clients, the fragile client is given higher priority; and (4) generating the data to be transferred at a reduced size.

A fragile client may be given higher priority relative to "less fragile" clients in at least two ways. First, more system resources (e.g., CPU, memory, etc.) may be allocated to handle a request from a fragile client than other less fragile clients. Additionally or alternatively, a request from a fragile client may be processed before requests from other less fragile clients regardless of when the requests were sent to or received by WS device 130.

Generating data to be transferred at a reduced size may comprise one or more of the following approaches: (1) compressing the data to be transferred if the fragile client is capable of decompressing the received data (e.g., in scanning scenario); (2) generating data at a lower resolution than the resolution specified in the service request (e.g., in scanning scenario); or (3) generating data in black and white instead of in color as specified in the service request (e.g., in scanning scenario).

Another example for processing requests from fragile clients includes Web service 150 compressing a scanned document if the corresponding scan request indicated that the fragile client does not expect WS device 130 to fully accommodate all the scan job settings that are specified in the scan request. In a related example, Web service 150 may scan a document in TIFF compressed data format instead of the client's requested TIFF uncompressed data format.

In an embodiment, data handling module 140C adjusts the chunk size dynamically during the transfer of a document. For example, data handling module 140C, before any data of a document is sent to a client device, determines that the chunk size should be 32 KB. After one or more chunks of the document are sent to the client device, data handling module 140C determines that the chunk size of subsequent chunks of the document should be changed to 8 KB. This determination may be based on the criteria described above, such as detecting that the network bandwidth has lowered (either before the data transferring began or while the data transferring is occurring) or detecting that the processing and/or memory resources on the client device and/or on WS device 130 have decreased.

As indicated above, at least some of the functionality of data handling module 140C (e.g., the chunk size determination) may be performed by another device connected to network 120. In that case, WS device 130 sends the client identifier to the other device, which determines a chunk size based on one or more factors and returns the chunk size to WS device 130. Additionally, WS device 130 may send, to the other device, current communication statistics regarding a client device. The other device then determines, based at least upon the communication statistics and during transmission of a document to the client device, whether to adjust the chunk size of the remaining chunks of the document. In case the chunk size determination is offloaded to other device or server, the client needs to contact that other device or server (and not WS device 130) in order to request for its chunk size. If a client needs to send data to WS device 130, then the client can connect to the appropriate service on WS device 130 and request a determination of an appropriate chunk size.

2.3.3.1 Data Transmission Serial Number

Each chunk of data (or simply "chunk") of a single document is included in a separate SOAP message or envelope. Thus, a document may be transferred between a client device and WS device 130 using many distinct SOAP messages. Each chunk is associated with (1) a document or file identifier (ID) and (2) a data transmission serial number (DTSN) (also referred to as a "chunk ID"). A document ID identifies the document of which the corresponding chunk is a part. A DTSN identifies the corresponding chunk relative to other chunks associated with the same document. It is possible that two chunks of different documents may have the same DTSN. However, a document ID in conjunction with a DTSN uniquely identifies the chunk relative to all other chunks that WS device 130 or the client sends out within a certain timeframe. Alternatively, document IDs and DTSNs may repeat over time. However, the repeating identifiers and numbers may occur at such a time (e.g., a year later) that there should be no identifier conflicts with earlier documents and chunks. The document ID and DTSN may be included (1) in the header portion of a SOAP message or (2) in the body portion of the SOAP message.

There are multiple situations in which a connection with a client device or a WS device may be deemed lost or terminated. For example, a client device may be waiting for chunks of a particular document and not receive, from WS device 130, any chunks for that document for a certain period of time. This may occur if, for example, WS device 130 is scanning a document and WS device 130 is currently experiencing a high processing load. The client device may presume that the network connection with WS device 130 was dropped even though the network connection is stable. In response, the client device closes the connection. If the client device later resumes the connection (or begins a new session with WS device 130), then WS device 130 does not have to resend the chunks that the client device has already received. In one approach, the client device informs WS device 130 of the last DTSN for a particular document ID that the client device received. In another approach, WS device 130 records the last DTSN and document ID that WS device 130 is able to deliver. WS device 130 then determines which chunk (if any) needs to be resent and which chunk is the next chunk in sequence.

As another example, WS device 130 may be waiting for chunks of a particular document and not receive, from a client device, any chunks for that document for a certain period of time. This may occur if, for example, the client device is sending a document to WS device 130 for printing and the client device is currently experiencing a relatively high processing load. WS device 130 may presume that the network connection with the client device was dropped even though the network connection is stable. In response, WS device 130 closes the connection. If WS device 130 later resumes the connection (or begins a new session with the client device), then the client device does not have to resend the chunks that WS device 130 has already received. In one approach, WS device 130 informs the client device of the last DTSN for a particular document ID that WS device 130 received. In another approach, the client device records the last DTSN and document ID that the client device is able to deliver. The client device then determines which chunk (if any) needs to be resent and which chunk is the next chunk in sequence.

The above two examples illustrate scenarios in which no network problem exists. Instead, one of the devices presumes there is a network problem when no network problem exists. In related examples, one or more chunks of a document may be resent or retransmitted because a network problem does exist.

2.3.4 Subscription Management Module

Subscription management module 140D processes event subscription requests. For example, subscription management module 140D records (a) the identification of one or more events to which a client device subscribes and (b) the IP address of entity (referred to as the "event sink") that is to be notified when WS device 130 generates one of the events. An event sink is an entity that is to be notified of an event. An event sink for a particular event may be the same entity that subscribed for the particular event or a different entity than the one that subscribed for the particular event. Because the IP address of an event sink may change, subscription management module 140D maintains an association between the IP address and the wsa:From field value (or client ID). As described above, if the wsa:From field value is not present in the request message, then the client ID will be used. Usually, wsa:From (EPR) and client ID are not supposed to be changed. If the IP address of the event sink has changed (i.e., by matching was:From or client ID), then subscription management module 140D updates the saved event sink information automatically to reflect the new event sink IP address.

Subscription management module 140D may update subscription information such as expiration time, event sink address if needed, and notification delivery status.

2.3.5 Log Module

Log module 140E stores and maintains log information regarding one or more of client devices 110A-C. The log information comprises similar type of information described above, such as previous communications from client devices 110A-C, the current connection with client device 110A-C, and previous load and current load on WS device 130.

As indicated above, this log information may be uploaded to a central server that maintains such information about client devices 110A-C and, optionally, one or more other client devices and their respective interactions with WS device 130 and other WS devices.

Additionally, if the log information is uploaded to a central server, then the log information may further include service-specific information about multiple Web services (including Web service 150) and multiple WS devices (including WS device 130). A client device may then connect to this central server and request the log information to discover the current status of each Web service and each WS device, including performance metrics of those Web services and WS devices.

3.0 Example Document Transfer

Figure 2:
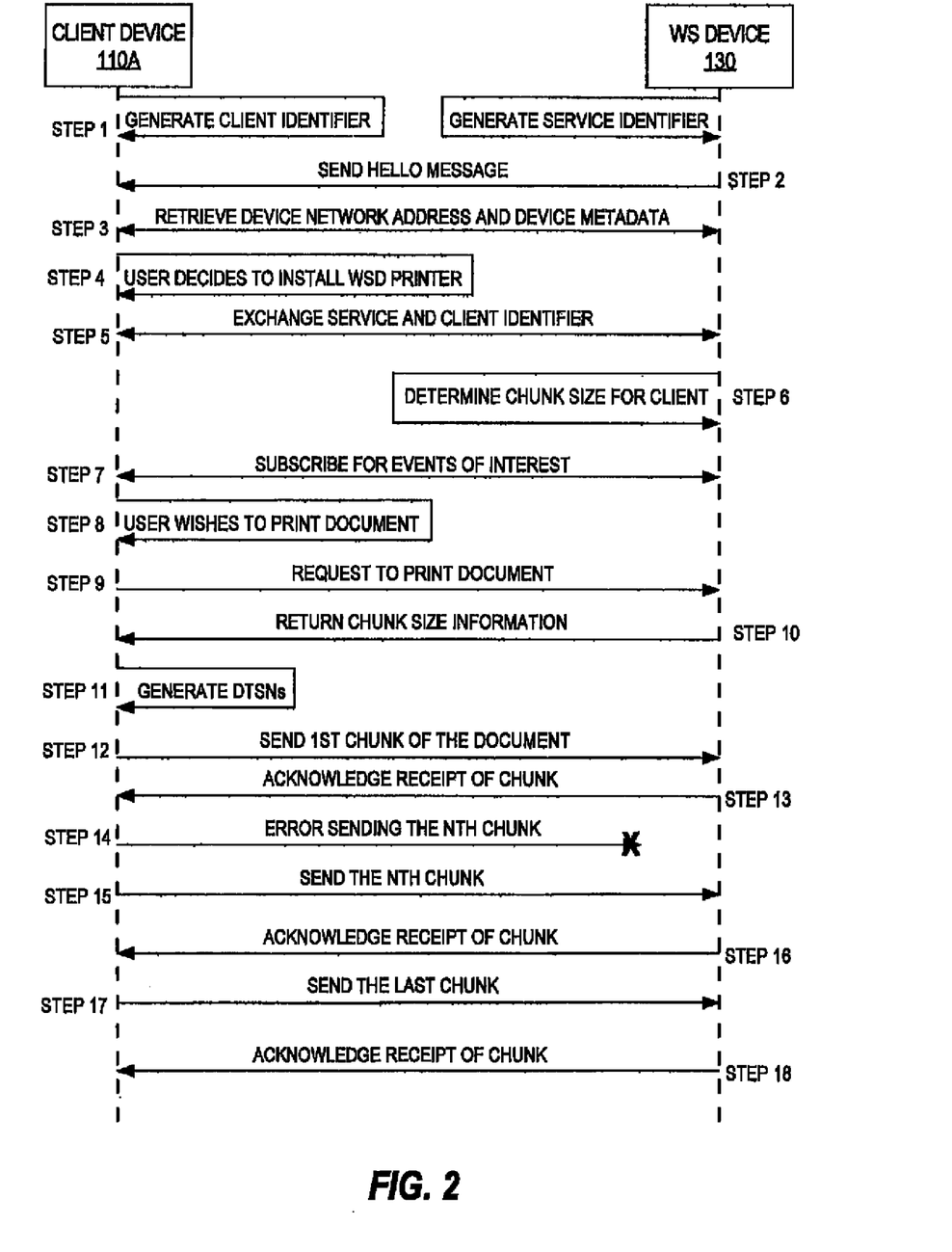
FIG. 2 is a sequence diagram that depicts an example set of communications between a client device and a WS-enabled device, according to an embodiment of the invention.

FIG. 2 is a sequence diagram that depicts an example set of communications between client device 110A and WS device 130, according to an embodiment of the invention. Although depicted in a particular order, embodiments of the invention are not limited to this particular order. One or more of the steps (e.g., step 1) may be performed at a different point in the depicted sequence.

At step 1, client device 110A generates a client ID and WS device 130 (e.g., Web service 150) generates a service ID. Although depicted as occurring at the same time, the generation of the respective IDs does not have to occur simultaneously. For example, client device 110A may have generated its client identifier before interacting with a different WS device or upon its initial boot.

At step 2, WS device 130 (e.g., communication module 140A) broadcasts a HELLO message into network 120 to indicate the presence of WS device 130. A HELLO message is broadcasted when WS device 130 is brought online or when its metadata has been changed.

At step 3, client device 110A sends a device metadata request to WS device 130. The device metadata request may be composed based on a WS-Transfer specification. In response, WS device 130 sends, in a metadata response the device metadata to client device 110A. Device metadata is data that describes device characteristics and the relationship between the device and the hosted service(s). The metadata response may be composed based on WS-Transfer, WS-MetadataExchange, and DPWS specifications.

At step 4, a user of client device 110A decides to install a WSD printer that allows client device 110A to send print jobs to WS device 130 for WS device 130 to process.

At step 5, client device 110A and WS device 130 (e.g., communication module 140A) exchange their respective identifiers generated in step 1.

At step 6, WS device 130 (e.g., data handling module 140C) determines a size for chunks that may be sent to client device 110A in the future. This size may be a default size if no log information about client device 110A exists. Also, client device 110A may determine an appropriate chunk size for itself or contact an external service for a chunk size determination.

At step 7, client device 110A sends one or more subscription requests to WS device 130 (e.g., and processed by subscription management module 140D). These one or more subscription requests conform to the WS-Eventing standard. Each subscription request is for subscribing to one or more events that WS device 130 detects. If WS device 130 detects one of the events, then WS device 130 (e.g., subscription management module 140D) will generate and send an event notification message to client device 110A.

At step 8, the user inputs data that requests a document to be printed by WS device 130. At step 9, in response to the input data, client device 110A sends a print job request to WS device 130.

At step 10, in response to the print job request, WS device 130 (e.g., communication module 140A) sends chunk size information to client device 110A in addition to other information, such as a print job ID. The chunk size information indicates how large each chunk (or at least the first chunk) of the document should be when client device 110A sends to WS device 130.

At step 11, client device 110A generates one or more DTSNs. Based on the chunk size information, client device 110A may determine how many chunks of the document will be sent. Therefore, client device 110A may generate all the DTSNs. Alternatively, because the chunk size may be adjusted after one or more chunks of the document have been sent and before all the chunks of the document have been sent, client device 110A may delay generating a DTSN for a chunk until immediately before the chunk is sent to WS device 130.

At step 12, client device 110A sends the first chunk of the document to WS device 130. Again, the SOAP message that includes a chunk also includes a document ID that identifies the document and a DTSN that identifies the chunk relative to the other chunks of the document. At step 13, WS device 130 (e.g., communication module 140A) sends, to client device 110A, an acknowledgement that indicates that WS device 130 has received the chunk.

At step 14, client device 110A sends the $n^{th}$ chunk of the document to WS device 130. At step 14, client device 110A detects that an error occurred. The error may be due to, e.g., a network connection interruption. The error may have occurred during or after sending the $n^{th}$ chunk.

At step 15, if client device 110A sent the $n^{th}$ chunk, then client device 110A resends the $n^{th}$ chunk of the document to WS device 130. At step 16, WS device 130 (e.g., communication module 140A) sends, to client device 110A, an acknowledgement that indicates that WS device 130 has received the $n^{th}$ chunk.

At step 17, client device 110A sends the last chunk of the document to WS device 130. For purposes of brevity, the transmission of the chunks between the $n^{th}$ chunk and the last chunk is not described herein. At step 18, WS device 130 (e.g., communication module 140A) sends, to client device 110A, an acknowledgement that indicates that WS device 130 has received the last chunk.

Although the document transfer in FIG. 2 is from client device 110A to WS device 130, some of the steps (e.g., steps 1-3 and 5-7) might remain the same where the document transfer is from WS device 130 to client device 110A, other steps (e.g., steps 11-17) may be performed by the opposite party.

Additionally, FIG. 2 and the above description of FIG. 2 refer to client device 110A communicating with WS device 130. However, one or more processes on each of the respective devices may be performing the steps. For example, steps 3, 5, and 7 may be performed by one client process executing on client device 110A, whereas steps 9 and 11-16 may be performed by another client process executing on client device 110A. As another example, step 2 may be performed by one server process executing on WS device 130, whereas steps 6, 10, and 17 may be performed by another server process (e.g., Web service 150) executing on WS device 130.

Alternatively, steps 3, 5, and 7 may be performed by a first thread of a client process executing on client device 110A, whereas steps 9 and 11-16 may be performed by a second thread of the client process. Similarly, step 2 may be performed by a first thread of a server process executing on WS device 130, whereas steps 6, 10, and 17 may be performed by a second thread of the server process.

4.0 Example Soap Messages

Figure 3A:
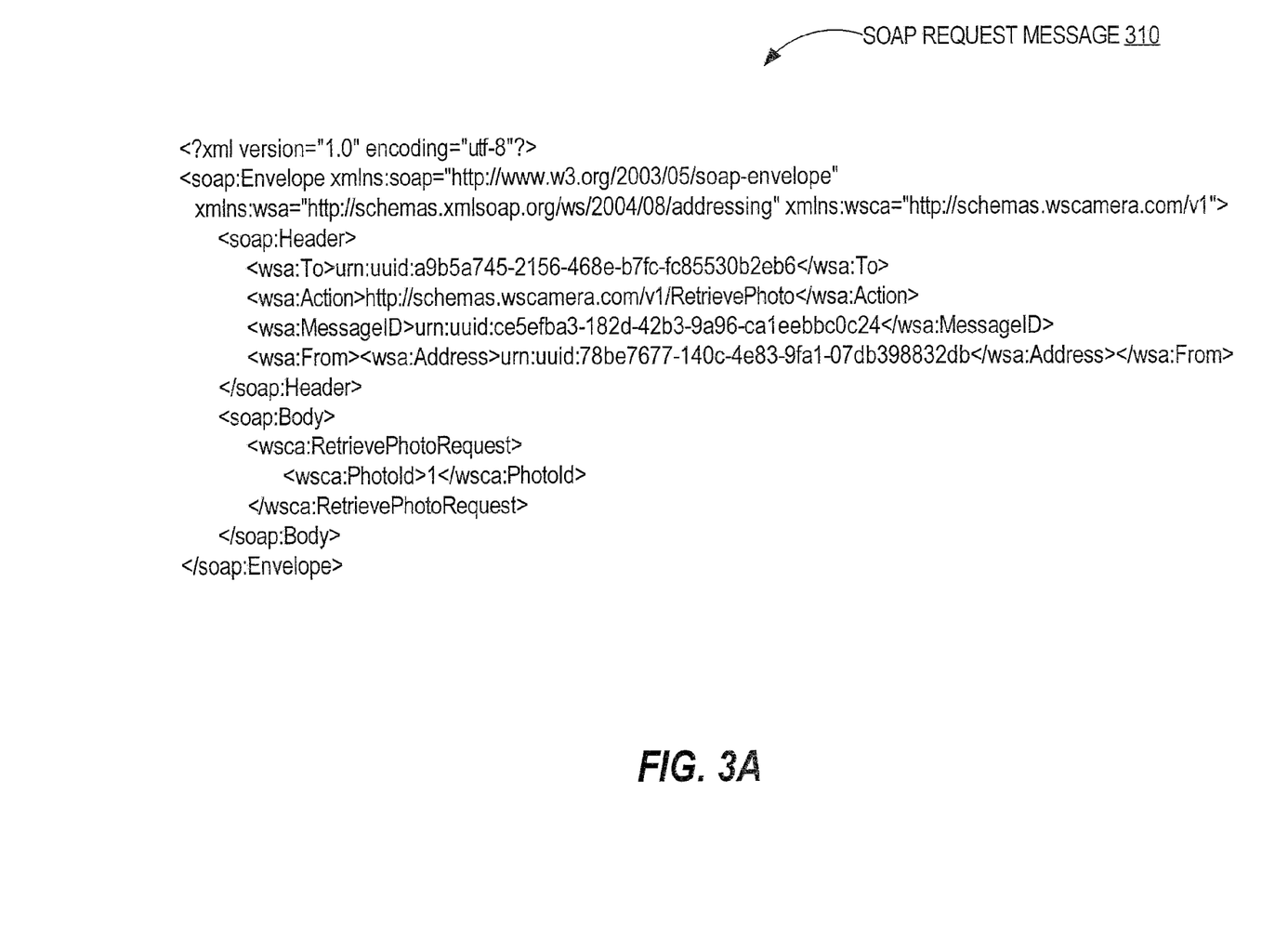
FIGS. 3A-B are diagrams that depict, respectively, an example SOAP request message and an example SOAP response message, according to an embodiment of the invention.
Figure 3B:
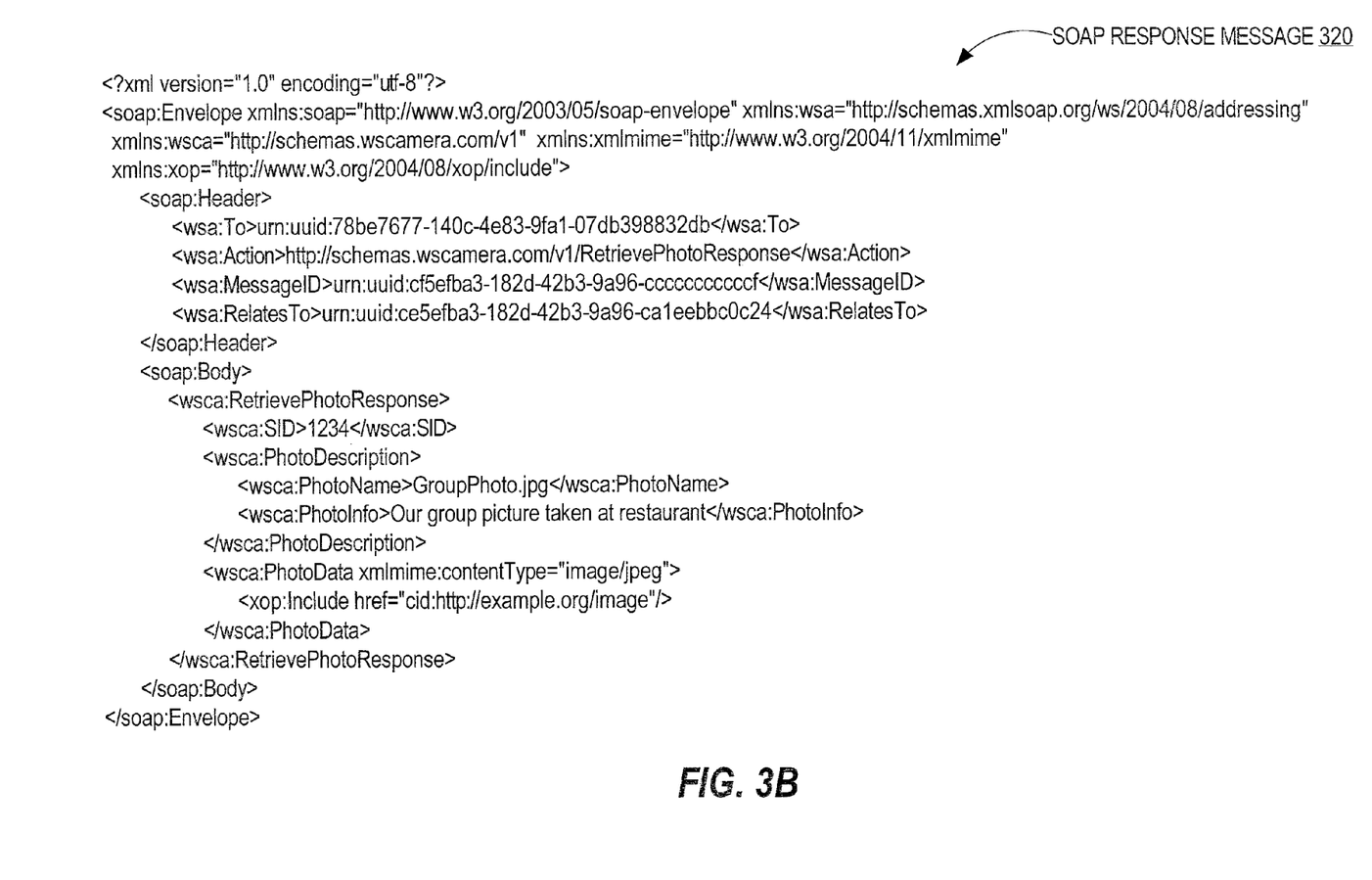

FIGS. 3A-B are diagrams that depict, respectively, an example SOAP request message 310 and an example SOAP response message 320, according to an embodiment of the invention. For simplicity, the HTTP header is removed from each SOAP message.

SOAP request message 310, generated by the client device, represents a request from a client device for a digital photograph from a digital camera. Request message 310 comprises a header portion and a body portion. The header portion indicates the source and destination addresses, the action requested (i.e., retrieve photo), and a message ID that uniquely identifies request message 310. The body portion indicates the ID of the photo that is requested.

SOAP response message 320, generated by the digital camera, represents a response to the SOAP request message 310. Response message 320 also comprises a header portion and a body portion. The header portion indicates a destination address (i.e., the address of the client device), the action that was performed (i.e., a photo retrieval response), a message ID that uniquely identifies message 320, and a message ID that identifies the message (i.e., request message 310) to which response message 320 is related. The body portion of response message 320 indicates (a) an SID (which corresponds to a DTSN), (b) a name and description of the requested photograph, (c) the photo format, and (d) how the photo data is sent relative to response message 320. The 'href' attribute of the 'xop:Include' element indicates where the photo data attachment is located. In Web Services, a large amount of data may be transferred via Message Transmission Optimization Mechanism (MTOM). A document ID is not included in response message 320 because (a) response message 320 is sent over HTTP and (b) both the client and the WS-enabled device can refer to the "wsca:PhotoId" field in request message 310 for the document ID.

5.0 Example Process Flow

Figure 4A:
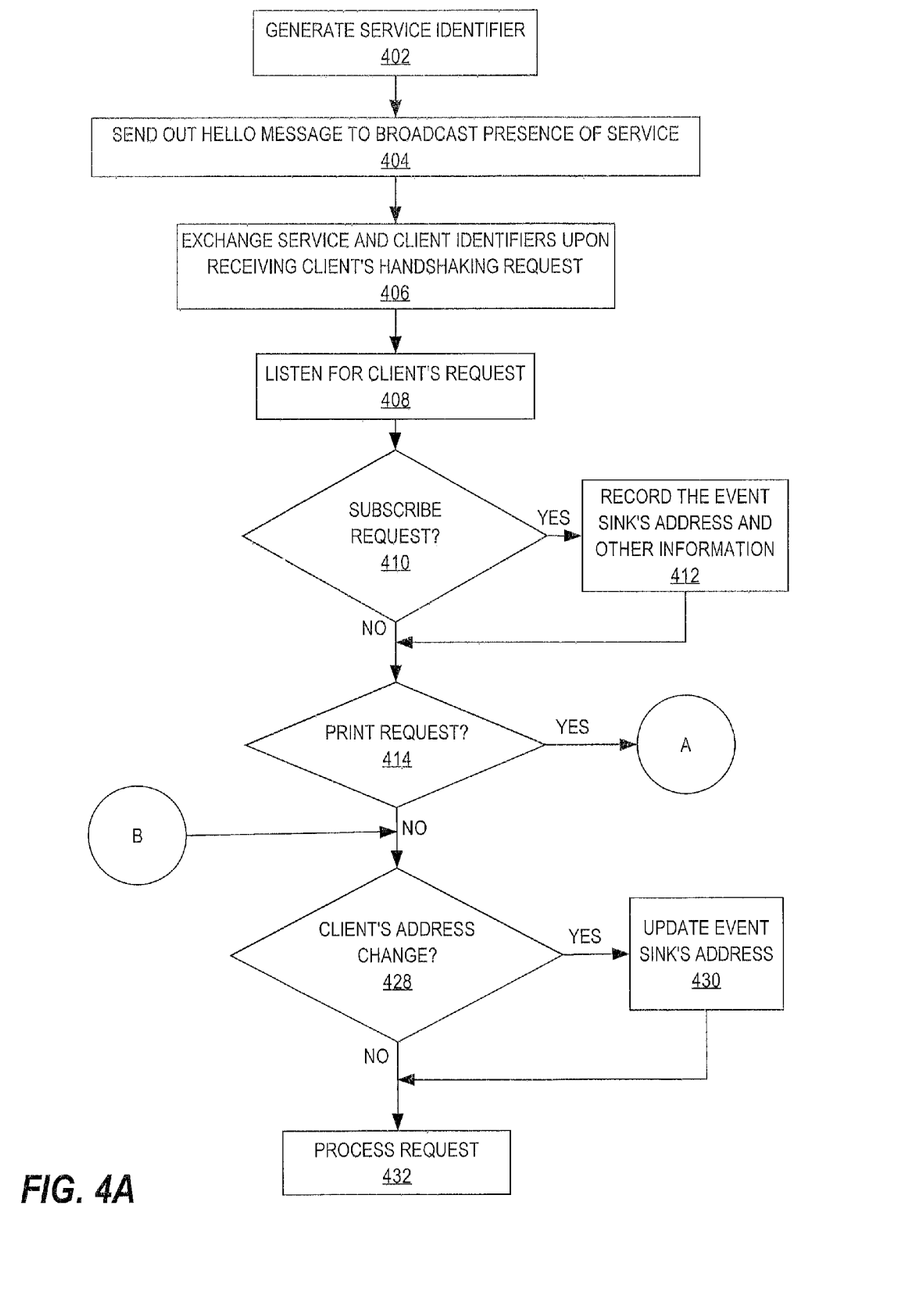
FIGS. 4A-B are flow diagrams that depict an example process flow for processing client requests at a WS-enabled device, according to an embodiment of the invention.
Figure 4B:
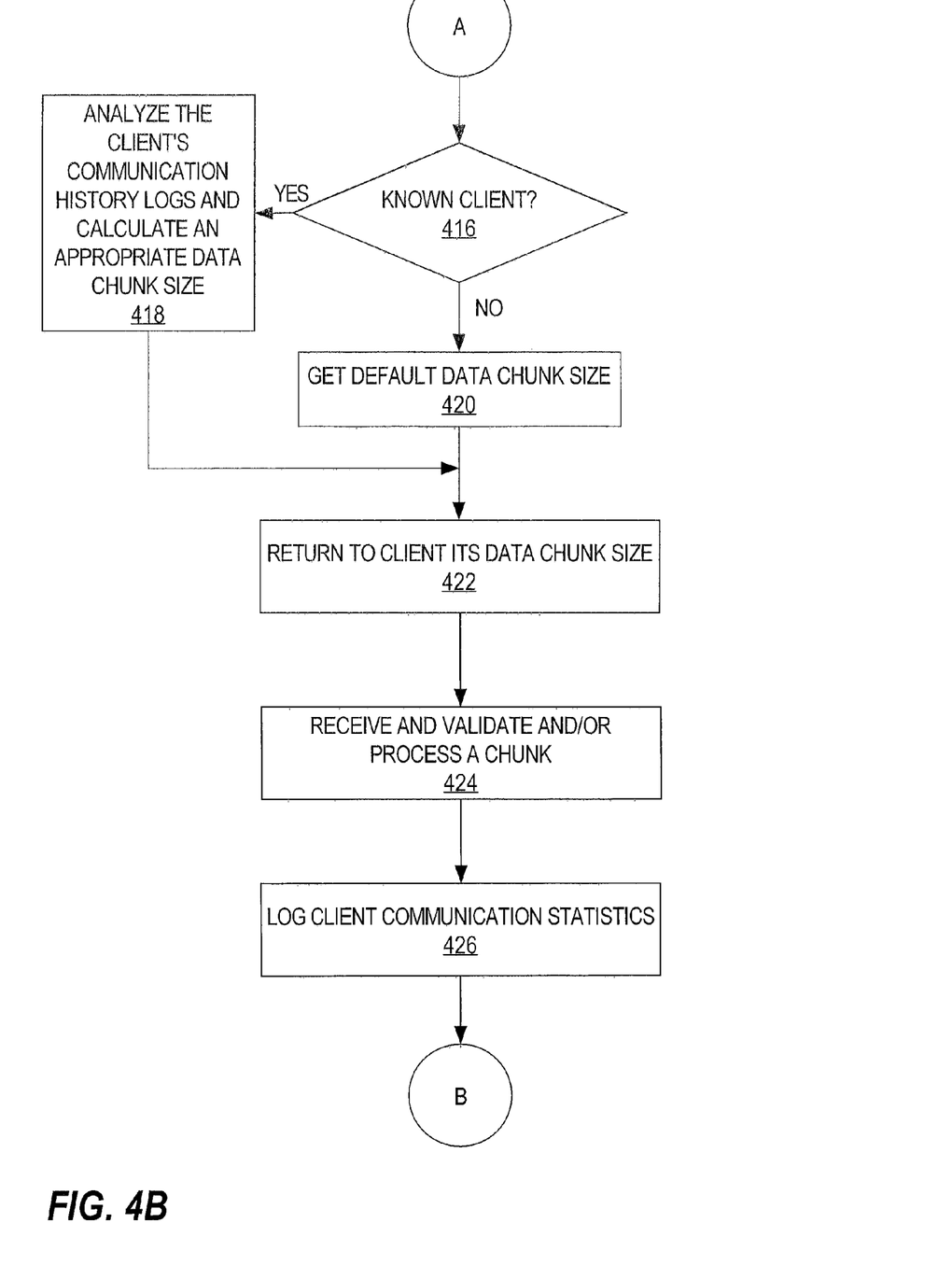

FIGS. 4A-B are flow diagrams that depict an example process flow for processing client requests at WS device 130, according to an embodiment of the invention. The following steps are from the perspective of WS device 130. Therefore, one or more processes executing on WS device 130 perform the following steps.

At step 402, Web service 150 generates a service identifier. Step 402 may occur upon Web service 150 starting up. Alternatively, similar to one or more of the following steps, another process executing on WS device 130 may perform step 402.

At step 404, communication module 140A broadcasts a HELLO message (i.e., as part of the WS-Discovery protocol) to indicate the service's presence. Although not depicted, step 404 may further comprise communication module 140A (a) receiving, from a client process that responds to the HELLO message, a metadata request message and (b) sending device metadata to the client process. If a client process does not receive a HELLO message from communication module 140A, then the client process may still send a PROBE message to search for a specific type of device and, once found, send a request to retrieve device metadata.

At step 406, client identification module 140B and the client process exchange their respective identifiers in response to receiving the client process's handshaking request.

At step 408, communication module 140A listens for and receives a SOAP message. Although FIG. 4A depicts only two types of requests (i.e., a subscribe request and a print request), embodiments of the invention are not limited to only these two requests. WS device 130 may receive and process many other types of requests sent from a client device, such as a request for log data.

At step 410, communication module 140A determines whether the SOAP message includes a subscribe request. If so, then, at step 412, subscription management module 140D records the event sink's address in association with other subscription-related information, such as the specified event to detect.

At step 414, communication module 140A determines whether the SOAP message includes a print request. If so, then, at step 416 (in FIG. 4B), client identification module 140B determines whether the client device is known. This determination may be performed by examining the client identifier from the SOAP message. If the client device is known, then, at step 418, data handling module 140C analyzes the communication history logs associated with the client device to calculate an appropriate chunk size. If the client device is not known, then, at step 420, a default chunk size is used.

At step 422, communication module 140A sends the chunk size to the client process. The client process will use the chunk size to generate SOAP messages that contain, within the body of each SOAP message, an amount of print data that is equal to (or nearly equal to) the chunk size.

At step 424, Web service 150 receives and validates and/or processes a chunk.

At step 426, log module 140E logs statistics regarding communication with the client process.

Returning to FIG. 4A, the client identification module 140B determines, at step 428, whether the client device's IP address has changed. If so, then, at step 430 the IP address of any event sink (associated with the client device) is updated to reflect the new IP address of the client device.

At step 432, Web service 150 (or another Web service of WS device 130) processes the request, which may be a request for printer/scanner configuration, capabilities, or status, or for the status of a print/scan job. Such requests may be processed with normal priority. Data transmission requests may be handled differently (e.g., with higher priority) in order to minimize the effect of network performance and help improve user experience.

6.0 Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
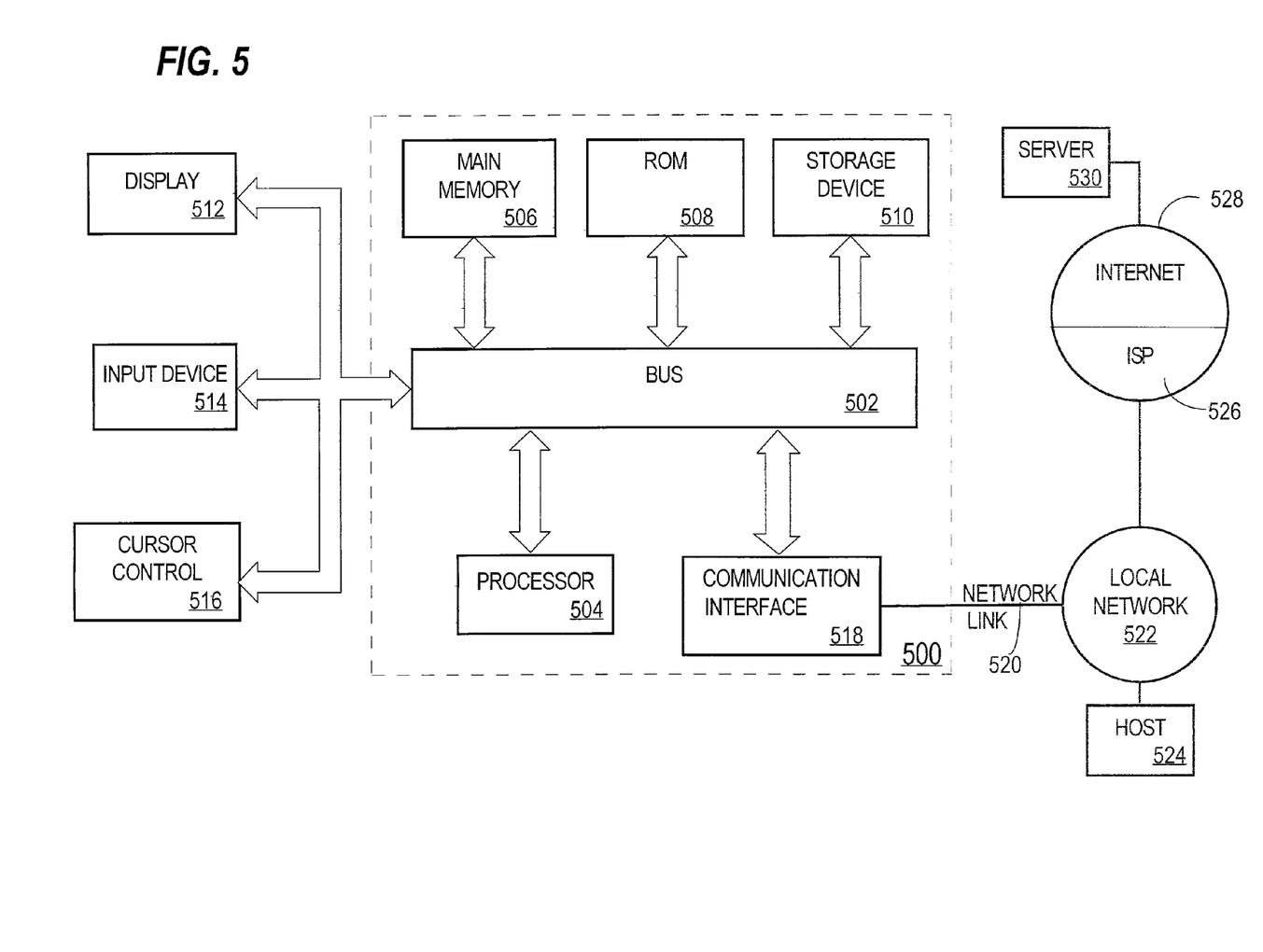
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

7.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An apparatus for transferring data, over a network, between a client process executing on a client device and a Web service executing on the apparatus, the apparatus comprising:
one or more processors;
one or more storage devices storing instructions which, when processed by the one or more processors, cause:
receiving, from the client process, a request message that indicates a request for a service provided by the Web service;
in response to receiving the request message, determining a first size for a portion of a file to be transferred between the client process and the Web service, wherein the portion of the file is less than all of the file;
after determining the first size, processing a first Simple Object Access Protocol (SOAP) message that includes a first portion of the file, a file identifier that identifies the file, and a first data transmission serial number that identifies the first portion relative to other portions of the file, wherein the size of the first portion is equal to the first size;
after the first SOAP message has been transferred between the client process and the Web service, determining, based on one or more criteria, a second size for a different portion of the file, wherein the second size is different than the first size; and
after determining the second size, processing a second SOAP message that includes a second portion of the file, the file identifier, and a second data transmission serial number that identifies the second portion relative to other portions of the file, wherein the size of the second portion is equal to the second size.

2. The apparatus of claim 1, wherein processing the first SOAP message comprises generating the first SOAP message and sending the first SOAP message to the client process.

3. The apparatus of claim 2, wherein the instructions, when processed by the one or more processors, further cause:
generating and sending, to the client process, a third SOAP message that includes a third portion of the file, the file identifier, and a third data transmission serial number that identifies the third portion relative to other portions of the file;
wherein the third SOAP message is either the same as the first SOAP message or the second SOAP message or different than the first SOAP message and the second SOAP message;
determining that the client process may not have received the third SOAP message; and
in response to determining that the client process may not have received the third SOAP message, resending the third SOAP message to the client process without resending any SOAP messages that included other portions of the file and that were sent before the third SOAP message.

4. The apparatus of claim 1, wherein processing the first SOAP message comprises receiving the first SOAP message from the client process.

5. The apparatus of claim 4, wherein the instructions, when processed by the one or more processors, further cause:
receiving a third SOAP message that includes a third portion of the file, the file identifier, and a third data transmission serial number that identifies the third portion relative to other portions of the file;
wherein the third SOAP message is either the same as the first SOAP message or the second SOAP message or different than the first SOAP message and the second SOAP message;
determining, based at least in part on the third data transmission serial number, that another portion of the file, that has not yet been received, should have been received before the third portion of the file; and
in response to determining that another portion of the file, that has not yet been received, should have been received before the third portion of the file, sending, to the client process, the data transmission serial number associated with the most recent SOAP message before the third SOAP message.

6. The apparatus of claim 1, wherein:
the client process generates and maintains a client identifier that is different than an IP address of the client device;
the SOAP message includes the client identifier; and
the instructions include additional instructions which, when processed by the one or more processors, further cause:
determining, based on the client identifier, whether access to network history information about previous network communications with the client process or client device is available;
if access to the network history information is available, then the first size is based at least in part upon the network history information.

7. The apparatus of claim 1, wherein the instructions, when processed by the one or more processors, further cause:
determining one or more second criteria associated with the client process; and
based on the one or more second criteria, prioritizing the client process by (a) allocating more resources to process the request than are allocated relative to other client processes or (b) processing the request before one or more other requests that were received at the Web service-enabled device before the request.

8. The apparatus of claim 1, wherein the one or more criteria is based on one or more of the following:
resource constraints of the apparatus;
resource constraints of the client device; or
network communication between the client process and the Web service.

9. The apparatus of claim 1, wherein the instructions, when processed by the one or more processors, further cause:
determining one or more second criteria associated with the client process; and
based on the one or more second criteria, generating data, based on one or more portions of the file, at a reduced size.

10. One or more non-transitory storage media storing instructions for transferring data, over a network, between a client process executing on a client device and a Web service executing on a Web service-enabled device, wherein the instructions, when executed by one or more processors, cause:
receiving, from the client process, a request message that indicates a request for a service provided by the Web service;
in response to receiving the request message, determining a first size for a portion of a file to be transferred between the client process and the Web service, wherein the portion of the file is less than all of the file;

after determining the first size, processing a first Simple Object Access Protocol (SOAP) message that includes a first portion of the file, a file identifier that identifies the file, and a first data transmission serial number that identifies the first portion relative to other portions of the file, wherein the size of the first portion is equal to the first size;

after the first SOAP message has been transferred between the client process and the Web service, determining, based on one or more criteria, a second size for a different portion of the file, wherein the second size is different than the first size; and after determining the second size, processing a second SOAP message that includes a second portion of the file, the file identifier, and a second data transmission serial number that identifies the second portion relative to other portions of the file, wherein the size of the second portion is equal to the second size.

11. The one or more non-transitory storage media of claim 10, wherein processing the first SOAP message comprises generating the first SOAP message and sending the first SOAP message to the client process.

12. The one or more non-transitory storage media of claim 11, wherein the instructions, when executed by the one or more processors, further cause:

generating and sending, to the client process, a third SOAP message that includes a third portion of the file, the file identifier, and a third data transmission serial number that identifies the third portion relative to other portions of the file;

wherein the third SOAP message is either the same as the first SOAP message or the second SOAP message or different than the first SOAP message and the second SOAP message;

determining that the client process may not have received the third SOAP message; and in response to determining that the client process may not have received the third SOAP message, resending the third SOAP message to the client process without resending any SOAP messages that included other portions of the file and that were sent before the third SOAP message.

13. The one or more non-transitory storage media of claim 10, wherein processing the first SOAP message comprises receiving the first SOAP message from the client process.

14. The one or more non-transitory storage media of claim 13, wherein the instructions, when executed by the one or more processors, further cause:

receiving a third SOAP message that includes a third portion of the file, the file identifier, and a third data transmission serial number that identifies the third portion relative to other portions of the file;

wherein the third SOAP message is either the same as the first SOAP message or the second SOAP message or different than the first SOAP message and the second SOAP message;

determining, based at least in part on the third data transmission serial number, that another portion of the file, that has not yet been received, should have been received before the third portion of the file; and in response to determining that another portion of the file, that has not yet been received, should have been received before the third portion of the file, sending, to the client process, the data transmission serial number associated with the most recent SOAP message before the third SOAP message.

15. The one or more non-transitory storage media of claim 10, wherein:

the client process generates and maintains a client identifier that is different than an IP address of the client device;

the SOAP message includes the client identifier; and the computer-implemented method further comprising:

determining, based on the client identifier, whether access to network history information about previous network communications with the client process or client device is available;

if access to the network history information is available, then the first size is based at least in part upon the network history information.

16. The one or more non-transitory storage media of claim 10, wherein the instructions, when executed by the one or more processors, further cause:

determining one or more second criteria associated with the client process; and based on the one or more second criteria, prioritizing the client process by (a) allocating more resources to process the request than are allocated relative to other client processes or (b) processing the request before one or more other requests that were received at the Web service-enabled device before the request.

17. The one or more non-transitory storage media of claim 10, wherein the one or more criteria are based on one or more of the following:

resource constraints of the Web service-enabled device;

resource constraints of the client device; or the network communication between the client process and the Web service.

18. The one or more non-transitory storage media of claim 10, wherein the instructions, when executed by the one or more processors, further cause:

determining one or more second criteria associated with the client process; and based on the one or more second criteria, generating data, based on one or more portions of the file, at a reduced size.

19. A method for transferring data, over a network, between a client process executing on a client device and a Web service executing on a Web service-enabled device, the method comprising:

receiving, from the client process, a request message that indicates a request for a service provided by the Web service;

in response to receiving the request message, determining a first size for a portion of a file to be transferred between the client process and the Web service, wherein the portion of the file is less than all of the file;

after determining the first size, processing a first Simple Object Access Protocol (SOAP) message that includes a first portion of the file, a file identifier that identifies the file, and a first data transmission serial number that identifies the first portion relative to other portions of the file, wherein the size of the first portion is equal to the first size;

after the first SOAP message has been transferred between the client process and the Web service, determining, based on one or more criteria, a second size for a different portion of the file, wherein the second size is different than the first size; and after determining the second size, processing a second SOAP message that includes a second portion of the file, the file identifier, and a second data transmission serial number that identifies the second portion relative to other portions of the file, wherein the size of the second portion is equal to the second size.

20. The apparatus of claim 9, wherein generating data, based on one or more portions of the file, at a reduced size includes at least one of:

compressing the one or more portions of the file;

generating the data at a resolution that is lower than the resolution specified in the request message; or generating the data in black and white instead of in color as specified in the request message.

* * * * *